(12) United States Patent
Van Tichelen et al.

(10) Patent No.: US 7,227,310 B2
(45) Date of Patent: Jun. 5, 2007

(54) METHOD AND DEVICES FOR CONTROLLING LOADS CONNECTED TO A POWER LINE

(75) Inventors: Paul Van Tichelen, Leuven (BE); Dominique Weyen, Lommel (BE)

(73) Assignee: Vlaamse Instelling Voor Technologisch Onderzoek (VITO), Mol (BE)

( * ) Notice: Subject to any disclaimer, the term of this patent is extended or adjusted under 35 U.S.C. 154(b) by 0 days.

(21) Appl. No.: 10/481,150

(22) PCT Filed: Jun. 26, 2002

(86) PCT No.: PCT/BE02/00107

§ 371 (c)(1),
(2), (4) Date: Dec. 15, 2003

(87) PCT Pub. No.: WO03/003608

PCT Pub. Date: Jan. 9, 2003

(65) Prior Publication Data

US 2004/0164688 A1    Aug. 26, 2004

(30) Foreign Application Priority Data

Jun. 28, 2001    (EP)    .................................. 01870146

(51) Int. Cl.
*H05B 37/04*    (2006.01)
*G05B 11/01*    (2006.01)

(52) U.S. Cl. .................. 315/136; 340/310.14; 375/259

(58) Field of Classification Search ................ 315/136, 315/247, 291–292, 294, 307, 312; 340/310.01, 340/870.3, 870.4, 870.39, 310.11, 310.14; 375/222, 259, 295, 316
See application file for complete search history.

(56) References Cited

U.S. PATENT DOCUMENTS

| | | | | |
|---|---|---|---|---|
| 3,594,584 A | * | 7/1971 | Woods ........................ | 327/455 |
| 4,254,403 A | * | 3/1981 | Perez-Cavero et al. | 340/310.04 |
| 4,408,185 A | * | 10/1983 | Rasmussen ............. | 340/310.02 |
| 5,264,823 A | * | 11/1993 | Stevens ....................... | 375/238 |
| 5,920,253 A | | 7/1999 | Laine ..................... | 340/310.01 |

FOREIGN PATENT DOCUMENTS

| | | |
|---|---|---|
| EP | 0 967 737 | 12/1999 |
| WO | WO 92/06552 | 4/1992 |

* cited by examiner

*Primary Examiner*—Thuy Vinh Tran
(74) *Attorney, Agent, or Firm*—Merchant & Gould P.C.

(57) ABSTRACT

The present invention is related to a method and devices for controlling at least one load connected to an AC power line. The method is based on the introduction of interruptions in the line voltage, which correspond to data being sent. The method centers on interruptions of variable length, yielding the opportunity of sending more data with a reduced number of interruptions. The invention is further related to a particular design of the transmitter and receiver. The transmitter is equipped with a means for measuring the line current. The receiver is equipped with a comparator with a feedback connection. The receiver is also capable of increasing momentarily the line current, which creates the possibility of sending information back towards the transmitter.

8 Claims, 4 Drawing Sheets

METHOD AND DEVICES FOR CONTROLLING LOADS CONNECTED TO A POWER LINE

This Application is a National Phase Application filed under 35 U.S.C. 371 claiming the benefit of International Application No. PCT/BE02/00107 filed Jun. 26, 2002, which has priority based on European Patent Office (EPO) Application No. 01870146.6 filed Jun. 28, 2001.

FIELD OF THE INVENTION

The present invention is related to a method and to devices for controlling loads such as lamps connected to a power line. In particular, the invention is related to a new type of power line modem, both for sending and receiving data, allowing to perform such a control.

STATE OF THE ART

The control of loads connected to a power line concerns the turning on/off of loads, monitoring their correct functioning, controlling specific features such as speed in case of motors, or light intensity in case of lamps.

Document U.S. Pat. No. 4,797,599 describes a circuit for lamp dimming wherein a control signal is sent over a separate wire. The main drawback of these techniques lies in the necessity of this separate wire, which complicates the design.

A powers line modem for lamp dimming is mentioned in the document entitled 'A novel dimmable electronic ballast for street lighting with HPS lamps', P. Van Tichelen et Al, conference record of the 2000 IEEE IAS conference, October 2000. These powerline modems add a modulated voltage signal (e.g. between 9–90 kHz) on the power line, so without the need for a separate wire. They are however relatively expensive to implement and susceptible to network noise. They also have a high power supply rating.

Moreover, this type of modem requires the use of repeaters to send information over long distances. These modems are not universally compliant with international standards, the high frequencies mentioned being different according to different standards.

Document WO-A-9206552 is related to a transmitter and receiver of data on a power line, by using the momentary interruption of the line voltage at or near the voltage zero crossing. A transmitter comprising a switch, in particular a triac is used to create these interruptions on the line voltage. As acknowledged in the document itself, this gives rise to problems when a capacitive or inductive load is used. To solve this problem, the cited document suggests an alternative transmitter and receiver circuit involving analysis of the voltage waveform with a micro-controller. This is however a complicated solution.

In the receiver described in WO-A-9206552 (FIG. 4), the presence of a voltage interruption is detected by a comparator 101, which produces a square wave at double the frequency of the supply voltage. The presence of a notch in the signal is detected by measuring the length of the pulses, delivered by 101.

AIMS OF THE INVENTION

The present invention aims to propose a method and devices enabling the control of one or more loads connected to a power line, in a simplified and cheaper way compared to prior art methods and devices.

The present invention further aims to propose a set of devices exhibiting a higher immunity to network noise, and a low harmonic distortion, while necessitating a lower power supply rating.

Finally, the present invention aims to propose a method and devices, which allow to avoid the use of repeaters, and which are compliant with all international standards.

SUMMARY OF THE INVENTION

The present invention is related to a device for receiving data on an AC power line which is connected to a power line voltage, and which is transporting a power line current through a set of two conductors, said device being characterised by the fact that it comprises:
  a microcontroller,
  a comparator, whose two inputs are connected through resistors to said two conductors, one input being connected to one conductor, the other input to the other conductor, so that said comparator produces at its output a square wave with the same frequency of said power line voltage, wherein said microcontroller comprises circuitry to measure the duty cycle of each period of said square wave produced by said comparator, and circuitry for deriving from said duty cycles an amount of data, and circuitry for sending a command signal towards a load, and wherein a feedback connection comprising a resistor is present between the output of said comparator and one of the inputs of said comparator.

According to the preferred embodiment, the device for receiving data according to the invention further comprises:
  a transistor and one or two diodes, each diode's anode being connected to a conductor of said power line,
  a resistor connected between the cathode(s) of said diode(s) and the collector of said transistor, said transistor being turned on or off by said microcontroller, so that the line current of said power line is increased upon switching on of said transistor.

In the receiving device according to the invention, one of the terminals of the supply voltage of said comparator is connected to one of the conductors of said power line, through at least two diodes.

The invention is equally related to a device (1) for sending data on an AC power line, which is connected to a power line voltage, and which is transporting a power line current through a set of two conductors, said data being transmitted towards a receiver according to the invention, said device comprising:
  a switching device, placed in one of the conductors of said power line,
  a microcontroller,
  a first connection between said microcontroller and said switching device,
  a second connection comprising one or more conductors between said microcontroller and at least one of said conductors of said power line, wherein said microcontroller comprises circuitry for producing a signal for changing the condition of said switching device through said first connection, circuitry for measuring an electric value through said second connection, and circuitry for introducing a predefined time delay before changing the condition of said switching device, characterised in that said device further comprises means for measuring the line current.

According to the preferred embodiment, said means for measuring the line current comprises a shunt resistor in one of the conductors of said power line and two connections between said microcontroller and points respectively before and after said shunt resistor.

According to one embodiment, said switching device is a triac or a group of two thyristors, said triac or said two thyristors being preferably equipped with a snubber network.

According to another embodiment, said switching device is a transistor, with the further addition of a diode bridge.

According to the preferred embodiment, the transmitting device of the invention, further comprises a connection (14) between said microcontroller and a point located between said switching device and the loads controlled by said device.

The transmitting device of the invention may further comprise a means for activating a dummy load circuit. Said dummy load circuit may comprise a transistor, a diode bridge, and a resistor. Said means for activating said dummy circuit comprise an optocoupler. Said dummy load circuit may be incorporated into said device for sending data.

The invention is equally related to the use of a device for receiving data according to claim 1, for commanding the switching on or off of a dummy load, said dummy load comprising a resistor, as well as to the use of a device for receiving data according to claim 2, for commanding the switching on or off of a dummy load, wherein said resistor is used as the dummy load.

The present invention is also related to a method for controlling at least one load connected to an AC power line, which is connected to a power line voltage, and which is transporting a power line current through a set of two conductors, said controlling taking place through the sending of data, said data being sent by momentarily interrupting the line voltage, characterised in that said method comprises the following steps:
   interrupting the line voltage of said AC power line during predefined interruption intervals,
   detecting said interruption intervals by detecting a deviation of the duty cycle of said line voltage from the duty cycle of the non-interrupted line voltage,
   deriving a message from the number and the length of these interruption intervals.

According to the preferred embodiment, the method of the invention comprises the steps of:
   introducing a first interruption, called reference interruption,
   measuring the deviation of the duty cycle from the duty cycle of the non-interrupted line voltage, and defining said deviation as a reference value,
   introducing interruptions during one or more cycles of the line voltage, following said reference interruption,
   measuring the deviation from the non-interrupted duty cycle, caused by said interruptions following the reference interruption, and comparing said measured deviations to said reference value,
   deriving from said comparison a set of transmitted data.

According to the preferred embodiment, after a fixed number of cycles, the reference interruption is introduced again in the line voltage, and a data transmission packet which was sent in between said first and second reference interruptions is valid when the duty cycle deviation caused by this second reference interruption is sufficiently close to the duty cycle deviation caused by said first reference interruption.

In the method of the invention, one interruption preferably consists of two interruptions of the same length, and introduced on two consecutive flanks of the voltage, i.e. either a rising and descending flank, or vice versa.

SHORT DESCRIPTION OF THE DRAWINGS

FIG. 1 illustrates the method of sending data by interrupting the line voltage.

FIG. 2*a* and 2*b* represent two embodiments of the circuit of a transmitter according to the invention.

DETAILED DESCRIPTION OF THE INVENTION

The present invention is related to devices and one particular method for controlling one or more loads connected to an AC power line, for example one or more lamps which are to be switched on/off or dimmed independently of each other. The basic embodiment of the method which is used here is known in the art. It is based on the technique of phase control of the line voltage in order to send data, for example a sequence of 0 and 1, towards one or more loads, said data being translated into commands, e.g. 'switch off a motor', 'dim a lamp',etc. . . . . The phase control is performed by short interruptions of the line voltage, preferably starting shortly before or after or simultaneously with a zero crossing of said line voltage. The length of these interruptions are short compared to the period of the line voltage, preferably not longer than 9% of said period. This means 1.8 ms for a 50 Hz signal. The subsequent fluctuations in the wave form of the line voltage are detected by a suitable device connected to the load, and translated into command signals. In this way, the digital information is not sent through a separate cable, but by a slight modification of the line voltage itself. This modification can be kept sufficiently reduced in order to minimise harmonic current distortion.

Figure 1:
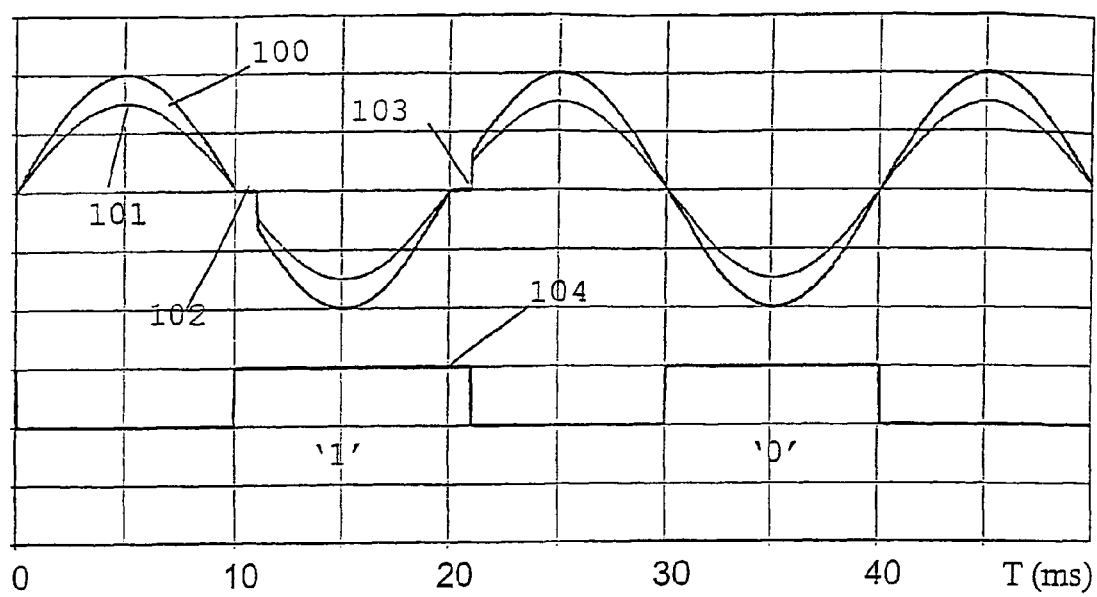

One embodiment of the method is illustrated in FIG. 1, which shows the sinusoidal line voltage 100 and line current 101 on a power line, in this case at 50 Hz. The case shown is relevant to a purely resistive load, i.e. voltage and current are in phase. At a zero crossing of the current and voltage, an interruption or 'hack' 102 is caused of about 1.5 ms in length, which is repeated by a second hack 103 of the same length on the following flank.

The drawing indicates the translation of this particular sequence of hacks into digital information (0 or 1). According to this embodiment, a 'hack' on two consecutive flanks represents a '1'. The absence of a hack on two consecutive flanks after this first '1',represents a '0'. The meaning of the interruptions may be reversed: two 'hacks' are then equivalent to '0' and two continuous zero crossings are equivalent to '1'.

In all cases, a sequence begins with a code that starts with two hacks, to indicate that a message is about to be sent. This first code may then be followed by an identification code for the specific load or loads addressed, and finally by a command code with a fixed length. Preferably, at the end of a message, an indication, for example two additional 'hacks' are added to mark the transition from sending of data to normal line voltage supply without hacks. For example, a message may consist of the following 4 parts:
- start bit (2 hacks)
- 8 address bits
- 8 command bits
- end bit (2 hacks)

In the receiver of the invention, described later, the detection of the command signals occurs through a comparator, whose output is a block wave 104, wherein the length of the blocks is representative of the value of the bits that are transmitted. A counter device is used to detect these differences in length. In the embodiment shown, the block wave 104 is 'high' during the negative half cycle of the voltage, when normal operation occurs (no interruptions). The output remains high during the interruptions, which causes the block length to become larger, when two consecutive interruptions are given on two consecutive flanks. Means must be provided to make sure that the output does in fact remain high during hacks, as will be explained further in the text.

In the previous embodiment, one voltage interruption on a falling edge and one interruption on the subsequent leading edge represents one bit. The first interruption can equally be on a leading edge.

The present invention is related to a method for sending more then one-bit information by one voltage interruption, by making the length of the interruption variable.

The preferred embodiment of the method of the invention comprises the following steps:

Step 1: A reference interruption is introduced. This interruption has a predefined length, and is introduced for example on two subsequent line voltage flanks, as described above.

Step 2: the reference interruption causes a deviation from the normal 50% duty cycle of the non-interrupted line voltage. This deviation is now measured and defined as a reference value.

Step 3: during one or more of the following line voltage cycles, interruptions of varying length are introduced. In every case, an interruption of the same length is introduced on two subsequent flanks, as described above. However, the length of a pair of interruptions in one line voltage cycle may be different from the length of the pair of interruptions introduced during the following line voltage cycle.

Step 4: the interruptions are detected as deviations from the 50% duty cycle, deviations which are now compared to the reference value.

Step 5: the comparison yields a set of different values, for example a set of ratios of measured deviation values, relative to the reference value. Other ways of comparing may be used. The length of the hacks may be measured and substracted from the length of the reference hacks.

Step 6: these values are translated, according to a predefined scheme, into a set of transmitted data, This method allows to transmit more data by a lower number of interruptions, which allows a quicker and more efficient control of loads connected to a power line.

In the preferred embodiment, an additional step is added, whereby, after a set of data has been transmitted in the way described above, the reference interruption is introduced once again, on two subsequent flanks. The duty cycle deviation is once again measured and should be the same as the original reference value. This is a way of checking whether the line load condition has changed during the transmission, thereby checking the validity of the transmission itself.

The line voltage and current of FIG. 1 are in phase, which is only true for a resistive load. In reality, a load will always have a degree of capacitive or inductive impedance. As will be explained later, the phase difference between V and I must remain between limits, in order for the transmitter and receiver of the invention, when equipped with a triac, to work properly. It could occur that a 'hack' is not introduced or is too short in length, due to an excessive phase difference.

Fluctuations in capacitive or inductive content may occur, causing sudden changes of the interruption lengths, which would yield transmission errors. Such fluctuations can be found by surveying the difference in the duty cycle deviation between a first reference interruption and a second reference interruption, introduced respectively before and after the sending of a data packet according to the above described method. The second reference interruption allows to check whether the duty cycle deviation has remained stable during the transmission of data. It is assumed that the line load conditions during the transmission of one data packet do not change considerably. Therefore, if the deviation has not changed beyond a predefined tolerance limit, it can be concluded that the transmission has been sent in a correct way.

Figure 2A:
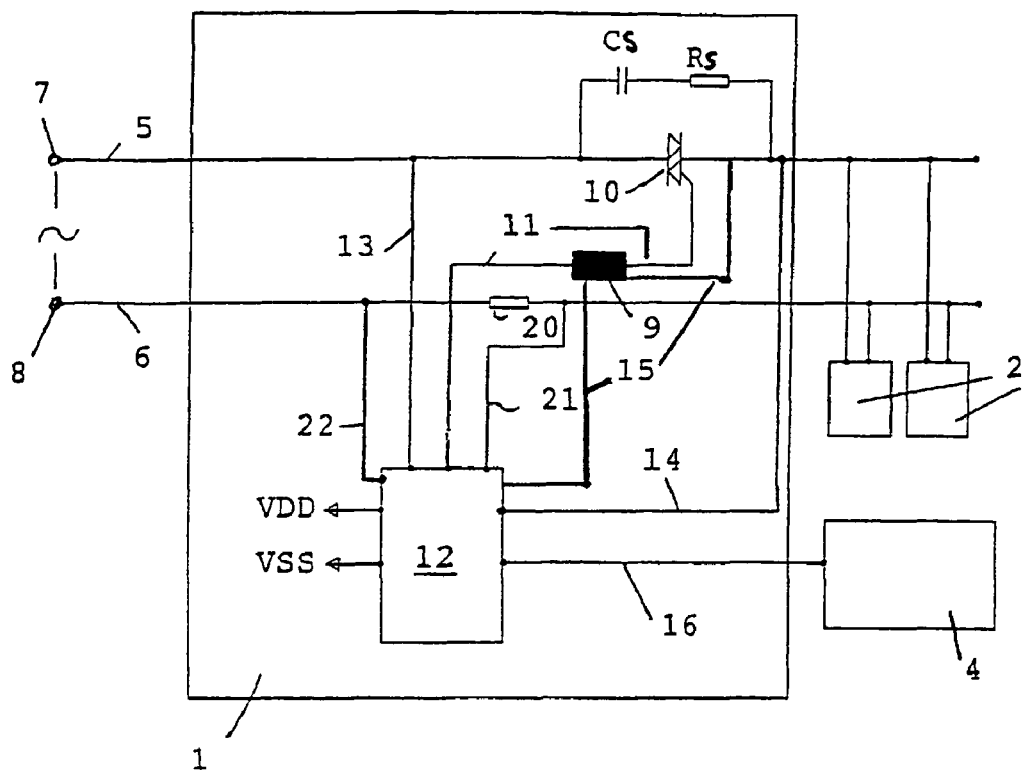
Figure 2B:
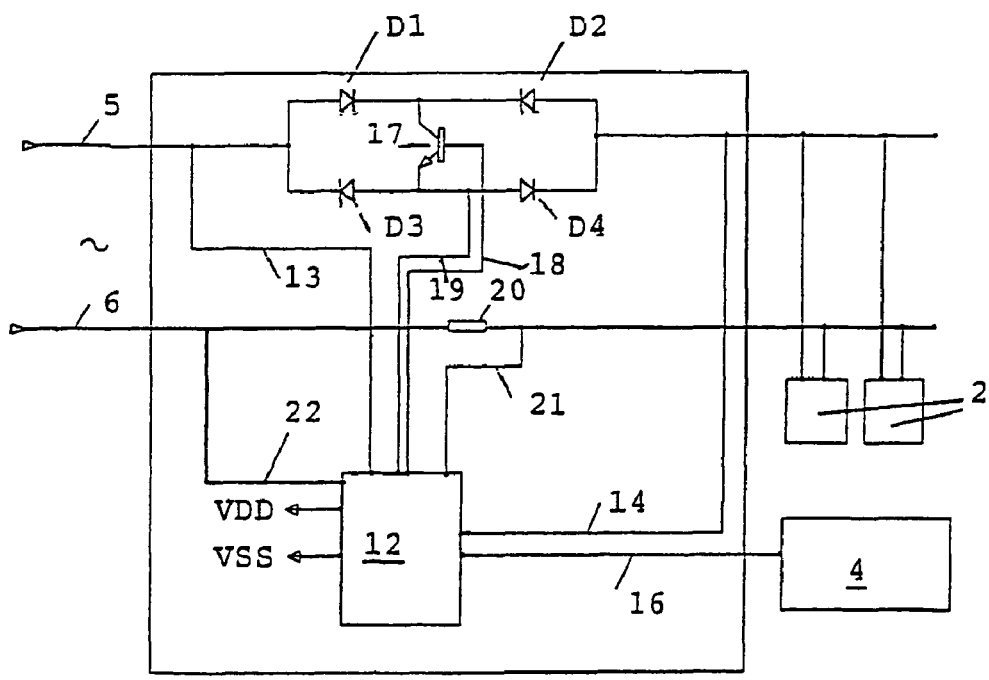

The present invention is further related to a combination of two devices needed in order to send and receive data by line voltage interruptions: a 'cluster' power line modem (PLM), the transmitter, used to control one or more of a specific group of loads, and a load PLM (receiver), in connection with each load. The transmitter comprises at least a microcontroller and a device able to interrupt the voltage, such as a transistor or a triac, or more generally two thyristors in anti-parallel, not necessarily packed into the same unit, as is the case for a triac. FIG. 2a shows an embodiment, based on a triac. FIG. 2b shows an embodiment that uses a transistor.

The transmitter is itself operated from a central control station 4, and controls a number of loads 2. FIG. 2 further shows the conductors 5 and 6 of the power line, an AC supply voltage being present between the input terminals 7 and 8.

The transmitter in FIG. 2a comprises first of all a triac 10, equipped with a classic snubber network, consisting of a capacity Cs and a resistor Rs, in parallel with the triac. The triac 10 is placed in the first conductor 5 of the power line and fired through connections 11 and 15, preferably through a triac driver 9, connecting the triac to a microcontroller 12, which is in turn operated by the control station 4. The microcontroller 12 is supplied by a voltage VDD (for example 5V DC) referenced to a reference voltage Vss.

The triac 10 is switched off as soon as the line current becomes zero. The zero crossing of the voltage is detected through connections 13 and 22. Under normal circumstances, meaning when no message is sent, the triac 10 is continuously fired through connections 11 and 15, so that the triac is immediately re-fired after a zero crossing of the current and no interruption of the line current and voltage takes place. However, when an interruption needs to be introduced, the firing of the triac after zero crossing of the current is slightly delayed, over a period of time (for example 1.5 ms for a 50 Hz signal) programmed into the microcontroller, and starting from the moment when the voltage becomes zero. This period of time may be constant or variable. In the latter case, the transmitter may be used to implement the method of the invention, described above. The delay causes a detectable interruption of the line voltage, leading to a line voltage curve 100 such as shown in FIG. 1. The micro-controller 12 comprises programmable counter circuitry known in the art to create the delay before firing the triac 10.

When using a triac as the switching device, the phase difference between line voltage and line current is an important factor. In the theoretic case of a zero phase difference, the zero crossings of voltage and current are simultaneous and no problem occurs (see FIG. 1). However, when the voltage zero crossing precedes the current zero crossing (i.e. for an inductive load), a very short voltage interruption length might occur or the 'hack' might be missed altogether. Similar problems arise in the case of a capacitive load.

It is to be noted that the voltage measurement through connections 13 and 22 to detect zero voltage, may be replaced by a current measurement. In this case, the delay would start from a zero crossing of the current. Also, one connection (13 for example) may be present, while the other conductor of the power line is connected to a suitable reference voltage (e.g. Vss).

The transmitter in FIG. 2 comprises an additional connection 14 from a point in the first conductor 5, after the triac (i.e. between the triac and the loads 2), to the microcontroller 12. This allows a control of the transmitted signal. The microcontroller 12 may check in this way whether all interruptions that were ordered, were effectively transmitted in the form of voltage interruptions. For example in the case of inductive loads, this may not be the case, as explained previously. Suitable circuitry should be added to the microcontroller 12 to measure the voltage through connection 14 and to perform a corrective action on the transmitted signal in case a fault is detected (for example, increasing the interruption time).

Despite the use of these corrective measures, when a triac is used, the phase difference between voltage and current should be as small as possible, i.e. the power factor of the loads should approach 1. Therefore, the device of FIG. 2a is ideally used in combination with a Power Factor Corrector device, for example placed before each one of an array of electronic lamp loads connected to the power line.

Transistors can be switched independently of the line current. FIG. 2b shows the circuit of a transmitter of the invention, wherein the triac is replaced by a transistor 17 and a diode bridge D1 to D4. The transistor can be switched on or off at any time through connections 18 and 19, independent of the line current zero crossing. The diode bridge is necessary to allow the current to change direction during one period. The other elements of the circuit in FIG. 2b are identical and carry the same reference number than the elements in FIG. 2a. The embodiment of FIG. 2b is an alternative to the one with the triac, but can only be used with loads which are not inductive.

In the embodiments of FIG. 2, the transmitter further comprises a resistor 20 in the second conductor 6 and a connection 21 to the microcontroller 12. The resistor 20 is a shunt resistor, and is used to measure the line current. In this case, the microcontroller comprises circuitry to be able to measure this line current, through connections 21 and 22. According to the invention, a modification of the line current, may be induced by one of the receivers, communicating in this way information concerning the state of a load to the transmitter. This is explained in more detail after this. Another device than a shunt resistor may be used for measuring the line current, for example a current transformer.

The transmitter can be commanded from the control station 4 through a connection 16. The transmitter may also be controlled by a remote control through a wireless connection.

Figure 3:
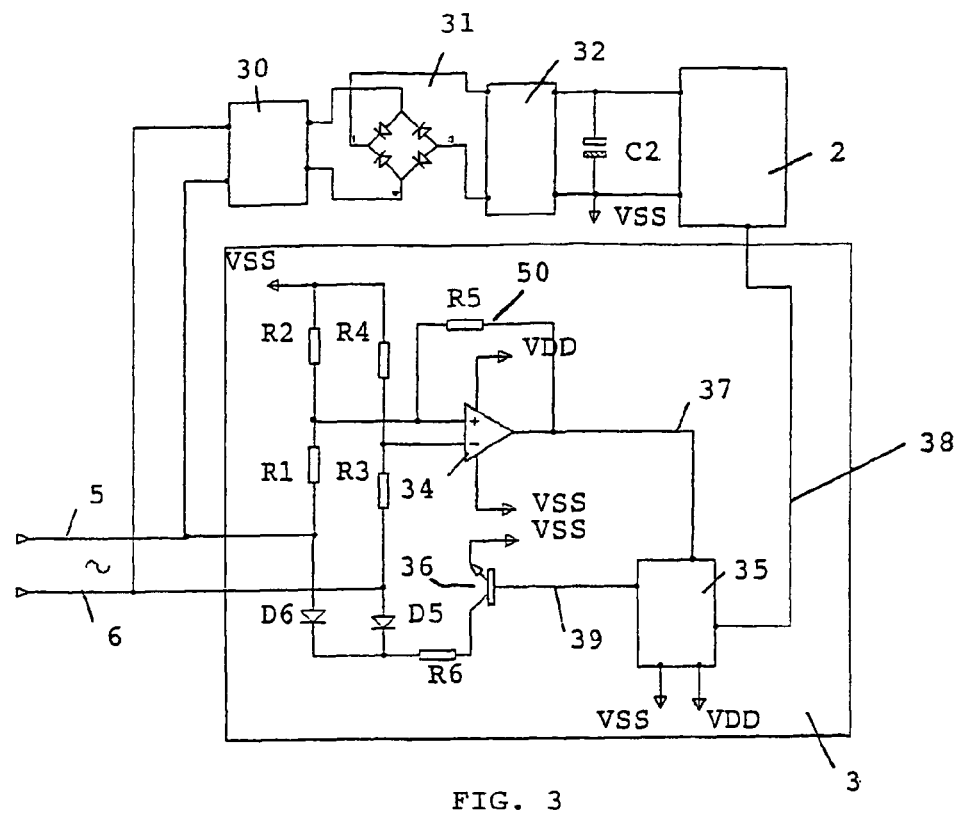
FIG. 3 represents the circuit of a receiver according to the invention.

FIG. 3 shows the circuit of the receiver, also called 'load PLM' 3 according to a preferred embodiment. Also in FIG. 3 is an example of a load 2 (e.g. a lamp with a dimming circuit). The load is connected to the power line, via an EMI (Electro Magnetic Interference) filter 30, a rectifier 31 essentially for creating a DC bus towards the load 2, a Power Factor Corrector 32, and a capacity C2 for compensating fluctuations over the DC bus. These elements are included by way of example and are in no way restrictive to the scope of the invention.

The receiver 3, as shown in FIG. 3, comprises a comparator 34, a microcontroller 35, a transistor 36. A feedback connection 50 comprising a resistor R5 is connected between the comparator's output and one of its inputs. The second conductor 6 of the power line is connected to the inverting input of the comparator 34 by way of a resistor R3, and said inverting input is connected by way of a resistor R4, to the same reference potential (Vss) as the negative output of the rectifier 31. The first conductor 5 of the power line is connected to the non-inverting input of the comparator 34 by way of a resistor R1 and said non-inverting input is connected, by way of a resistor R2, to the same reference potential (Vss). The resistors R1, R2, R3 and R4 are arranged as voltage dividers, in order to produce suitable signals at the inputs of the comparator 34. In this particular case, R5 is especially important, since it creates the certainty that the output of the comparator remains high during the delay time (hacks 102 and 103, FIG. 1).

The feedback via R5 may equally take place to the inverting input of the comparator 34. The importance of the feedback resistor is now explained in more detail. The receiver circuit of the invention works with a single comparator 34. This circuit can produce a square wave pulse which is synchrone with the line frequency and which has an almost 50% duty cycle under normal operation. When a line voltage interruption is introduced, a single comparator would not be able to detect a deviation from the square wave pulse under normal operation because both inputs of the comparator are equal and the output state would not be properly defined. This is why the feedback resistor R5 is introduced. When the line voltage is interrupted, the resistor R5 forces the output of the comparator 34 to remain stable, i.e. a positive output voltage if the feed back is connected to the non-inverting input of the comparator 34 or a low (zero or negative) output if the feed back is connected to the inverting input of the comparator 34.

This effect ensures the desired duty cycle shift of the comparator's output pulse (such as illustrated in FIG. 1), when a voltage interruption has been introduced.

For a proper functioning of the comparator circuit, the supply voltage of the comparator 34 (VDD&VSS) is preferably defined with respect to the line voltage. A direct connection to one of the line voltages (5 or 6) of VDD or VSS of comparator 34 is not possible, this can be derived by a person skilled in the art and was confirmed experimentally. To solve this problem, one of the comparator supply voltages (VSS or VDD) is connected to the output of a diode rectifier bridge 31, see FIG. 3. In general terms, it is necessary that VDD or Vss be connected to one of the two conductors 5 or 6 of the power line, through at least two diodes. In FIG. 3, this condition is fulfilled, since Vss is connected to conductor 5, through the two lower diodes of the diode bridge rectifier 31.

Figure 4:
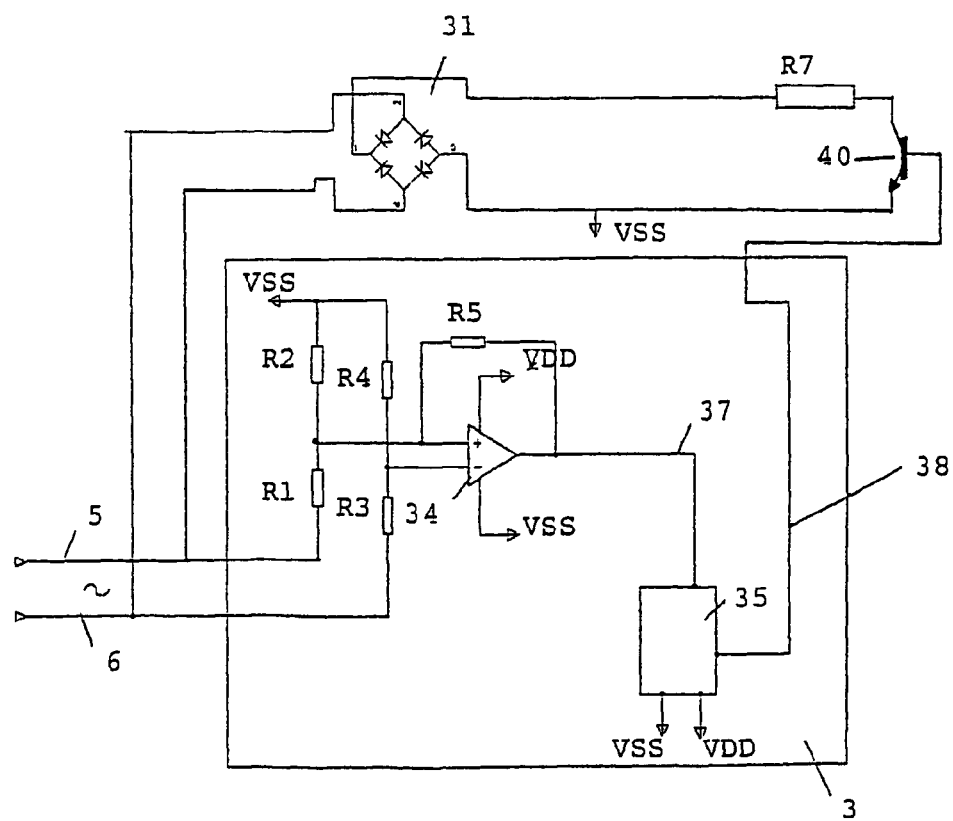
FIG. 4 represents a receiver according to the invention connected to a dummy load.

It is clear for persons skilled in the art, that an alternative comparator with positive and negative supply voltage can be used instead of the scheme of FIG. 3 and 4. This is however less practical because of the necessity of a dual supply voltage and because digital circuits are mostly interfaced with a zero to positive supply voltage.

The diode rectifier bridge 31 can be part of an active rectifier circuit as currently often used in electronic ballast circuits, but this is not an absolute requirement.

The output of the comparator 34 is connected to a microcontroller 35 by the connection 37. The comparator 34 and the microcontroller 35 are supplied by a DC supply voltage (VDD), for example a 5 V source, referred to the same reference potential (Vss) mentioned already.

The output of the comparator is a block wave, wherein the lengths of the blocks are in direct relation to the information that is sent. In the example of FIG. 1, the length of a 'high' block at the comparator's output is increased by the amount of one delay. The length of said block is measured by the microcontroller 35. The detected delays can be translated into digital data, according to the methods described above. For the purpose of measuring the block lengths, the microcontroller 35 is preferably equipped with a suitable counter circuit.

In turn, the microcontroller 35 commands the load 2, based on the control signals received, through the connection 38.

In the embodiment of FIG. 3, the receiver is able to send information to the transmitter, for example in answer to a question asked by the transmitter on the condition of the load, e.g. is a load defect or not? For this purpose, the transistor 36 may be fired by the microcontroller through connection 39. The presence of diodes D5 and D6 respectively connected to the power line conductors 5 and 6, and of the resistor R6 causes an increase of the line current during two consecutive half cycles as soon as the transistor 36 conducts, R6 being connected between the collector of the transistor 36 and the common cathode of the diodes D5 and D6. One diode (D5 or D6) would be enough to obtain a current increase during one half cycle.

The emitter of the transistor 36 is connected to the reference potential Vss. The current increase is preferably limited in time to two half-cycles. This increase of line current is detected by the transmitter, via the shunt resistor 20 and connections 21 22, as stated above.

A problem with triacs connected to electronic lamp ballasts with active rectifiers occurs when the lamps are switched off. In this case the input EMI filter draws very irregular input current and this causes irregular switch off of the triac, making it difficult to send data. Also, the reactiveness of the loads is no longer defined and may become capacitive or inductive to such an extent that sending data becomes impossible, as explained above. These problems are avoided by keeping part of the lamps on during communication.

In certain applications, such as domestic applications for example, it is undesirable to leave lamps or loads on at certain moments. To avoid this, a 'dummy' load may be added to the power line, see FIG. 4. This dummy load essentially consist of a resistor R7 that can be supplied through the power line by switching on a transistor 40. Such a dummy load may then be commanded by a receiver according to the invention, but simplified compared to the one in FIG. 3, in that it comprises only the comparator circuitry to receive command signals from the transmitter. The microcontroller 35 then commands the operation of the transistor 40 and therefore the on/off operation of the dummy load, through connection 38. The transmitter will keep this dummy load activated as long as no other real load 2 is on, and switch the dummy load off, as soon as at least one real load is on. Preferably however, the dummy load is not active all the time, but only during the interruptions of the line voltage. For example, when the lamps are off, the general reactive impedance of the loads may be too high, so that a suitable voltage interruption cannot be introduced, in order for example to send a 'switch on' command. If the dummy load is activated, this ensures that the phase difference between voltage and current is temporarily restored to a very low value, so that the 'hack' can be sent without problems. After the interruption, the dummy load is again deactivated.

In another embodiment, the function of the dummy load is performed by the resistor R6 in the receiver circuit, while the switching on or off of the dummy load is done by transistor 36. In this way, a receiver according to FIG. 3 may perform all functions of receiving data, sending back information, AND acting as a dummy load.

Figure 5:
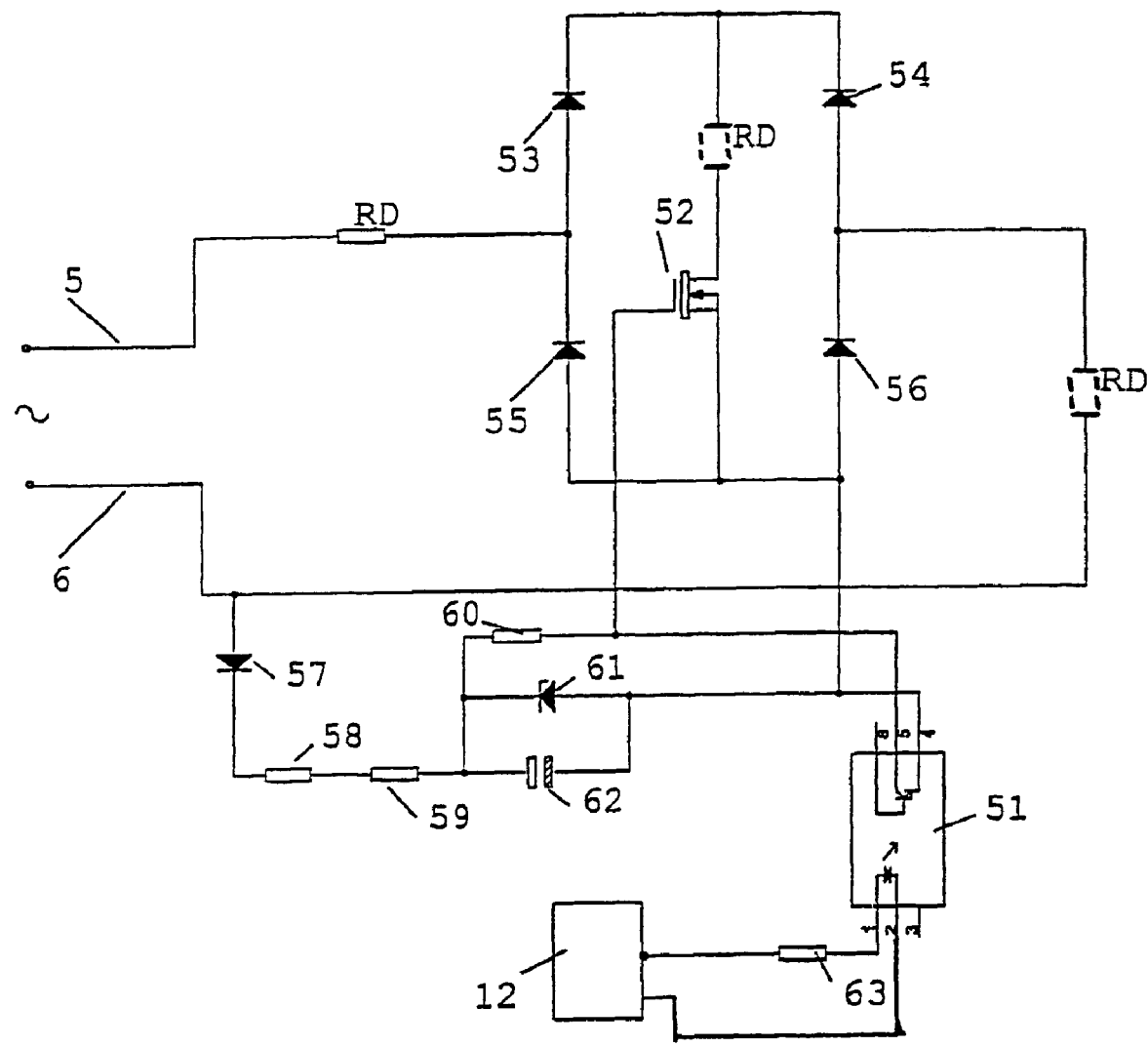
FIG. 5 represents the circuit of a dummy load, which can be activated by the transmitter of the invention.

According to a preferred embodiment of the transmitter, a dummy load is operated by the transmitter, and a dummy load circuit may even be incorporated into the transmitter. FIG. 5 shows a dummy load circuit which is activated by the microcontroller 12 of the transmitter, through the optocoupler 51. The dummy load's circuit comprises a diode bridge (53 to 56) and a resistor RD. In the drawing in FIG. 5, three possible alternative locations of the resistor RD are shown. It is to be understood that only one resistor RD is present in the circuit. The resistor is actually added to the load impedance seen by the line voltage between conductors 5 and 6, when the dummy load is activated. Activation of the dummy load of FIG. 5 is preferably also only done during the line voltage interruptions. The rest of the circuitry of the dummy load circuit include a diode 57, two resistors in series 58 and 59, a Zener diode 61, a capacitor 62 and a resistor 60. The elements 57 to 62 are part of a circuit for supplying power to the transistor 52. Any other circuit performing the same function may be used. A resistor 63 is present between the microcontroller 12 and the optocoupler 51.

The method and apparatuses of the invention are easy to implement. The method and the devices described comply with all international standards. The transmitting and receiving devices require a low power supply rating. No repeaters are necessary. The short interruptions allow to limit the harmonic current distortions, while the operation at low frequencies is beneficial for the immunity to network noise.

The invention claimed is:

1. A device for sending data on an AC power line connected to a power line voltage, and which is transporting a power line current through a set of two conductors, said device comprising:

a switching device, placed in one of the conductors of said power line, a microcontroller, a first connection between said microcontroller and said switching device, one or more conductors forming a second connection between said microcontroller and at least one of said conductors of said power line, wherein a dummy load circuit is added to the power line, and wherein said microcontroller comprises circuitry for producing a signal for changing a condition of said switching device through said first connection, circuitry for measuring an electric value through said second connection in order to detect a zero crossing of said electric value, and circuitry for introducing a predefined time delay before changing the condition of said switching device, thereby producing an interruption of the power line voltage, wherein the device for sending data further comprises means for activating the dummy load circuit during said interruption, and deactivating said dummy load after the interruption.

2. The device according to claim 1, wherein said dummy load circuit comprises a transistor, a diode bridge, and a resistor.

3. The device according to claim 1, wherein said means for activating said dummy load circuit comprise an optocoupler.

4. The device according to claim 1, wherein said dummy load circuit is incorporated into said device for sending data.

5. The device according to claim 1, wherein said switching device is a triac or a group of two thyristors, said triac or said two thyristors being equipped with a snubber network.

6. The device according to claim 1, wherein said switching device is a transistor, and wherein said device for sending data further comprises a diode bridge.

7. The device according to claim 1, further comprising means for measuring the line current.

8. The device according to claim 7, wherein said means for measuring the line current comprise a shunt resistor in one of the conductors and two connections between said microcontroller and points respectively before and after said shunt resistor.

* * * * *